United States Patent
Resheff et al.

(10) Patent No.: US 7,046,753 B2
(45) Date of Patent: May 16, 2006

(54) INTERFERENCE CANCELLER WITH FAST PHASE ADAPTATION

(75) Inventors: Guy Resheff, Haifa (IL); Dan Charash, Haifa (IL)

(73) Assignee: Provigent Ltd., Herzlia (IL)

( * ) Notice: Subject to any disclaimer, the term of this patent is extended or adjusted under 35 U.S.C. 154(b) by 133 days.

(21) Appl. No.: 10/881,601

(22) Filed: Jun. 29, 2004

(65) Prior Publication Data

US 2005/0286665 A1    Dec. 29, 2005

(51) Int. Cl.
*H04B 1/10* (2006.01)
*H03D 1/06* (2006.01)

(52) U.S. Cl. .................................. 375/350; 375/346

(58) Field of Classification Search ............... 375/350, 375/346, 347, 345, 355, 267, 285; 455/313, 455/323, 296, 447; 329/306, 310
See application file for complete search history.

(56) References Cited

U.S. PATENT DOCUMENTS

| | | |
|---|---|---|
| 4,310,813 A | 1/1982 | Yuuki et al. |
| 4,321,705 A | 3/1982 | Namiki |
| 4,367,555 A | 1/1983 | Namiki et al. |
| 4,438,530 A | 3/1984 | Steinberger |
| 4,479,258 A | 10/1984 | Namiki |
| 4,575,862 A | 3/1986 | Tahara et al. |
| 4,577,330 A | 3/1986 | Kavehrad |
| 4,606,054 A | 8/1986 | Amitay et al. |
| 4,631,734 A | 12/1986 | Foschini |
| 4,644,562 A | 2/1987 | Kavehrad et al. |
| 4,688,235 A | 8/1987 | Tahara et al. |
| 4,857,858 A | 8/1989 | Tahara |
| 4,910,468 A | 3/1990 | Ohtsuka et al. |
| 4,914,676 A | 4/1990 | Iwamatsu et al. |
| 4,992,798 A | 2/1991 | Nozue et al. |
| 5,023,620 A | 6/1991 | Matsuura |
| 5,068,667 A | 11/1991 | Mizoguchi |

(Continued)

FOREIGN PATENT DOCUMENTS

EP    1 365 519 A1    11/2003

(Continued)

OTHER PUBLICATIONS

Johnson, Jr., C. Richard, et al., "Blind Equalization Using the Constant Modulus Criterion: A Review", Proceedings of the IEEE, Oct. 1998, vol. 86, No. 10, pp. 1927-1950.

*Primary Examiner*—Khai Tran
(74) *Attorney, Agent, or Firm*—Darby & Darby (57) ABSTRACT

A receiver includes an input circuit, which is coupled to at least one antenna so as to receive, process and digitize first and second signals, thus generating first and second streams of input samples. An interference cancellation circuit includes first and second processing chains, which are respectively coupled to filter the first and second streams of input samples using respective first and second adaptive coefficients to generate respective first and second filter outputs, at least one of the first and second processing chains being further adapted to apply a variable phase shift so as to compensate for a phase deviation between the first and second signals. An adder sums the first and second filter outputs so as to generate a third stream of output samples, which is representative of the first signal. A coefficient controller is operative to set the first and second adaptive coefficients and to separately set the variable phase shift responsively to the output samples.

57 Claims, 3 Drawing Sheets

U.S. PATENT DOCUMENTS

| | | |
|---|---|---|
| 5,075,697 A | 12/1991 | Koizumi et al. |
| 5,383,224 A | 1/1995 | Mizoguchi |
| 5,406,589 A | 4/1995 | Iwamatsu et al. |
| 5,432,522 A | 7/1995 | Kurokami |
| 5,495,502 A | 2/1996 | Andersen |
| 5,710,799 A | 1/1998 | Kobayashi |
| 5,838,740 A | 11/1998 | Kallman et al. |
| 5,844,950 A * | 12/1998 | Aono et al. ................. 375/346 |
| 5,901,343 A | 5/1999 | Lange |
| 5,905,574 A | 5/1999 | Vollbrecht et al. |
| 5,920,595 A | 7/1999 | Iwamatsu |
| 6,236,263 B1 | 5/2001 | Iwamatsu |
| 2002/0061752 A1 * | 5/2002 | Kurokami ................... 455/447 |
| 2004/0063416 A1 * | 4/2004 | Kuenen et al. ............. 455/313 |

FOREIGN PATENT DOCUMENTS

| | | |
|---|---|---|
| WO | WO-00/77952 A1 | 12/2000 |

* cited by examiner

INTERFERENCE CANCELLER WITH FAST PHASE ADAPTATION

FIELD OF THE INVENTION

The present invention relates generally to wireless communications, and specifically to methods and systems for increasing wireless link capacity by using multiple receivers.

BACKGROUND OF THE INVENTION

Polarization diversity can be used to provide two parallel communication channels over the same link with orthogonal polarizations, thus doubling the link capacity. Separate and independent signals are transmitted over the two channels thus defined. Despite the orthogonality of the channels, however, some interference between the signals occurs almost inevitably. In order to cancel the effects of this interference, the receiver may comprise a cross-polarization interference canceller (XPIC), which processes and combines the signals from the two receive antennas in order to recover the original, independent channel signals.

A variety of XPIC circuits are known in the art. For example, U.S. Pat. No. 4,914,676, whose disclosure is incorporated herein by reference, describes a cross-polarization interference canceller, which includes a phase difference detecting circuit for detecting a phase difference between main and interference polarization components. In response to the output of the phase difference detecting circuit, a phase shifter shifts a data discrimination clock signal, which is used by an A/D converter in digitizing the interference signal.

As another example, U.S. Pat. No. 5,920,595, describes a receiver that receives two orthogonally-polarized signals. One of the signals is equalized by a digital equalizing unit. The other signal is input to a digital "inter-cross wave compensation" unit, which outputs a compensating signal to be added to the equalized signal. In one embodiment, before this latter signal is input to the inter-cross wave compensation unit, its frequency is corrected by a phase rotating unit. The structure of the receiver is said to allow digital demodulation to be applied to the inter-cross wave compensation, thereby making it possible to form the apparatus as a LSI device and reduce the size and cost of the apparatus.

Other representative XPIC circuits are described, for example, in U.S. Pat. No. 5,710,799, in European Patent Application EP 1365519 A1, and in PCT Patent Application WO 00/77952 A1, whose disclosures are incorporated herein by reference.

SUMMARY OF THE INVENTION

Embodiments of the present invention provide improved methods and devices for interference cancellation, which are useful particularly in cross-polarization interference cancellation. In these embodiments, a transmitter transmits first and second signals over the air on first and second transmission channels, which typically have respective, orthogonal polarizations. A receiver downconverts and digitizes the first and second signals to generate fist and second streams of input digital samples. These samples are processed by a novel XPIC device in order to generate output samples in which the interference between the transmission channels is reduced. A decision device, such as a slicer, extracts the transmitted symbols from the interference-corrected outputs of the XPIC device.

Typically, the XPIC device comprises two digital processing channels, one for each of the transmission channels in the system. In each processing channel, both of the streams of input samples are filtered, and the filtered samples are then combined to generate the interference-corrected output samples for the corresponding transmission channel. Each of the streams of input samples is typically filtered by an adaptive digital filter, with coefficients that are determined adaptively by a relatively slow process, which estimates the inter-channel interference. In addition, before combining the filtered samples, the relative phase of the filtered sample streams is adjusted, using a variable phase rotator.

The phase correction applied by the rotator is determined adaptively by a fast process, based on the varying phase deviation between the transmission channels. The inventors have found that separating the fast phase rotation and slow filter adaptation processes in the XPIC device accords well with the actual physical processes that operate on the transmission channels themselves. By applying the phase correction in the digital domain, after filtering the individual sample streams, the control loop of the phase rotator is shortened. This configuration accelerates the convergence of the phase correction process, and therefore gives enhanced interference cancellation relative to systems known in the art.

There is therefore provided, in accordance with an embodiment of the present invention, a receiver, including:

an input circuit, which is coupled to at least one antenna so as to receive, process and digitize first and second signals, thus generating first and second streams of input samples;

an interference cancellation circuit, including:

first and second processing chains, which are respectively coupled to filter the first and second streams of input samples using respective first and second adaptive coefficients to generate respective first and second filter outputs, at least one of the first and second processing chains being further adapted to apply a variable phase shift so as to compensate for a phase deviation between the first and second signals; and an adder, which is coupled to sum the first and second filter outputs so as to generate a third stream of output samples, which is representative of the first signal; and a coefficient controller, which is operative to set the first and second adaptive coefficients and to separately set the variable phase shift responsively to the output samples.

In disclosed embodiments, the first and second processing chains respectively include first and second adaptive equalization filters. In one embodiment, at least one of the first and second processing chains includes an adaptive phase rotator, which is coupled to apply the variable phase shift to an output of at least one of the first and second adaptive equalization filters.

Typically the first signal contains interference due to the second signal, and the coefficient controller is operative to determine the first and second coefficients and the variable phase shift so as to reduce the interference due to the second signal in the stream of output samples.

In an aspect of the invention, the coefficient controller is operative to set the variable phase shift responsively to a first convergence factor, and to set at least the second adaptive coefficients responsively to a second convergence factor, wherein the convergence factors are selected so that the adaptive phase rotator adapts to a change in the interference due to the second signal substantially faster than the second adaptive filter. In disclosed embodiments, the coefficient controller is operative to determine an error value responsively to the output samples, and to set the first and second adaptive coefficients and the variable phase shift responsively to the error value. Typically, the coefficient controller is operative to determine respective error signals to apply in setting each of the first and second adaptive coefficients and the variable phase shift by applying different phase rotations to the error value. Additionally or alternatively, the receiver includes a further phase rotator, which is coupled to apply a further variable phase shift to the output samples responsively to the error value.

In a further embodiment, the coefficient controller is operative in an initial phase of operation of the receiver to determine the error value using a blind adaptation criterion, and in a subsequent phase of the operation of the receiver to determine the error value using a Least Mean Square (LMS) criterion. Typically, the blind adaptation criterion includes a constant modulus criterion.

In some embodiments, the first and second signals respectively carry first and second sequences of symbols representing first and second transmitted data, and the receiver includes a decision device, which is coupled to process the output samples in order to recover the first sequence of symbols.

Typically, the interference cancellation circuit is further operative to process the first and second streams of the input samples so as to generate a fourth stream of output samples, which is representative of the second signal. In some embodiments, the first and second signals are transmitted with respective first and second, mutually orthogonal polarizations.

There is also provided, in accordance with an embodiment of the present invention, a receiver, including:

an input circuit, which is coupled to at least one antenna so as to receive, process and digitize first and second signals, thus generating first and second streams of input samples; and an interference cancellation circuit, including:

a first adaptive filter, which is coupled to filter the first stream of input samples using first adaptive coefficients to generate a first filter output;

a second adaptive filter, which is coupled to filter the second stream of input samples using second adaptive coefficients to generate a second filter output;

an adaptive phase rotator, which is coupled to apply a variable phase shift to at least one of the first and second filter outputs so as to compensate for a phase deviation between the first and second signals; and an adder, which is coupled to sum the first and second filter outputs following application of the variable phase shift so as to generate a third stream of output samples, which is representative of the first signal.

There is additionally provided, in accordance with an embodiment of the present invention, apparatus for wireless communication, including:

a transmitter, which is operative to transmit first and second signals over the air; and a receiver, which includes:

an input circuit, which is coupled to at least one antenna so as to receive, process and digitize first and second signals, thus generating first and second streams of input samples;

an interference cancellation circuit, including:

first and second processing chains, which are respectively coupled to filter the first and second streams of input samples using respective first and second adaptive coefficients to generate respective first and second filter outputs, at least one of the first and second processing chains being further adapted to apply a variable phase shift so as to compensate for a phase deviation between the first and second signals; and an adder, which is coupled to sum the first and second filter outputs so as to generate a third stream of output samples, which is representative of the first signal; and a coefficient controller, which is operative to set the first and second adaptive coefficients and to separately set the variable phase shift responsively to the output samples.

In a disclosed embodiment, the transmitter is configured to transmit the first and second signals with respective first and second, mutually orthogonal polarizations, and wherein the input circuit is configured to separate the first and second polarizations.

There is further provided, in accordance with an embodiment of the present invention, apparatus for wireless communication, including:

a transmitter, which is operative to transmit first and second signals over the air; and a receiver, which includes:

an input circuit, which is coupled to receive, process and digitize the first and second signals so as to generate respective first and second streams of input samples; and an interference cancellation circuit, including:

a first adaptive filter, which is coupled to filter the first stream of input samples using first adaptive coefficients to generate a first filter output;

a second adaptive filter, which is coupled to filter the second stream of input samples using second adaptive coefficients to generate a second filter output;

an adaptive phase rotator, which is coupled to apply a variable phase shift to at least one of the first and second filter outputs so as to compensate for a phase deviation between the first and second signals; and an adder, which is coupled to sum the first and second filter outputs following application of the variable phase shift so as to generate a third stream of output samples, which is representative of the first signal.

There is moreover provided, in accordance with an embodiment of the present invention, a method for wireless communication, including:

receiving first and second signals transmitted over the air;

processing and digitizing the received signals so as to generate respective first and second streams of input samples;

filtering the first and second streams of input samples using respective first and second adaptive coefficients to generate respective first and second filter outputs, the filtering including applying a variable phase shift so as to compensate for a phase deviation between the first and second signals;

summing the first and second filter outputs following application of the variable phase shift so as to generate a third stream of output samples, which is representative of the first signal; and setting the first and second adaptive filter coefficients and separately setting the variable phase shift responsively to the output samples.

There is furthermore provided, in accordance with an embodiment of the present invention, a method for wireless communication, including:

receiving first and second signals transmitted over the air;

processing and digitizing the received signals so as to generate respective first and second streams of input samples;

filtering the first stream of input samples using first adaptive filter coefficients to generate a first filter output;

filtering the second stream of input samples using second adaptive filter coefficients to generate a second filter output;

applying a variable phase shift to at least one of the first and second filter outputs so as to compensate for a phase deviation between the first and second signals; and summing the first and second filter outputs following application of the variable phase shift so as to generate a third stream of output samples, which is representative of the first signal.

The present invention will be more fully understood from the following detailed description of the embodiments thereof, taken together with the drawings in which:

DETAILED DESCRIPTION OF EMBODIMENTS

Figure 1:
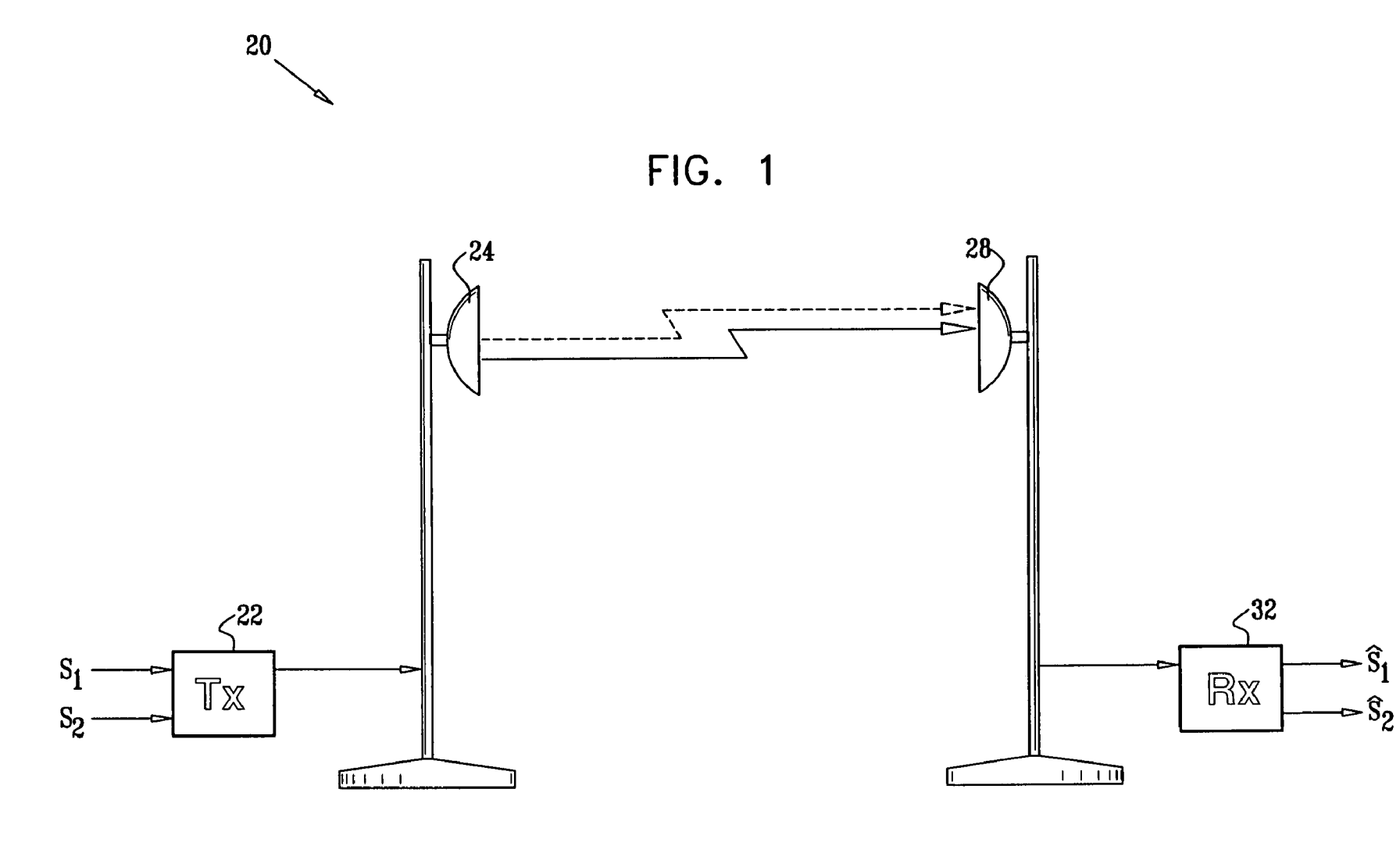
FIG. 1 is a schematic side view of a system for wireless data transmission over orthogonally-polarized channels, in accordance with an embodiment of the present invention.

FIG. 1 is a block diagram that schematically illustrates a wireless data transmission system 20, in accordance with a preferred embodiment of the present invention. System 20 comprises a transmitter 22, which is coupled to transmit signals $s_1$ and $s_2$ over the air via a transmit antenna 24. Typically, $s_1$ and $s_2$ carry streams of digital data, which are converted to data symbols by transmitter 22 according to a suitable modulation scheme, and are then upconverted to a predetermined radio frequency (RF) range for transmission, as is known in the art. Transmitter 22 and antenna 24 are configured to transmit $s_1$ and $s_2$ on orthogonally-polarized transmission channels. For example, the antenna may transmit $s_1$ with vertical polarization and $s_2$ with horizontal polarization. Alternatively, the signals may be transmitted with clockwise and counterclockwise circular polarizations. Further alternatively, separate transmit antennas (and/or separate received antennas) may be used for the two polarizations.

The signals transmitted via antenna 24 are received by a receive antenna 28. The signals received by antenna 28 are downconverted and processed by a receiver 32, in order to recover the transmitted digital data, represented as $\hat{s}_1, \hat{s}_2$ at the receiver output.

The dual-channel wireless link connecting transmitter 22 and receiver 32 is subject to fading and additive noise in each transmission channel, as well as interference between the channels. The amplitude and phase of the signals received by receiver 32 are determined by a complex channel transfer function matrix H, having elements $H_{11}$, $H_{12}$, etc. In other words, the transmitted signal vector $\underline{s}$ (made up of the individual complex signals $s_1$ and $s_2$ transmitted by antennas 24 and 26) and the received signal vector $\underline{x}$ (made up of $x_1$ and $x_2$) are related by the expression:

$$\underline{x} = H\underline{s} + \underline{n} \tag{1}$$

Here $\underline{n}$ represents the noise received at each antenna. $H_{ij}$ is the complex transfer function from transmit antenna i to receive antenna j, and represents generally a frequency-selective dispersive channel between these particular transmit and receive antennas. The off-diagonal terms in H represent the interference between the transmission channels. Receiver 32 adaptively cancels this interference, as described in detail hereinbelow.

Figure 2:
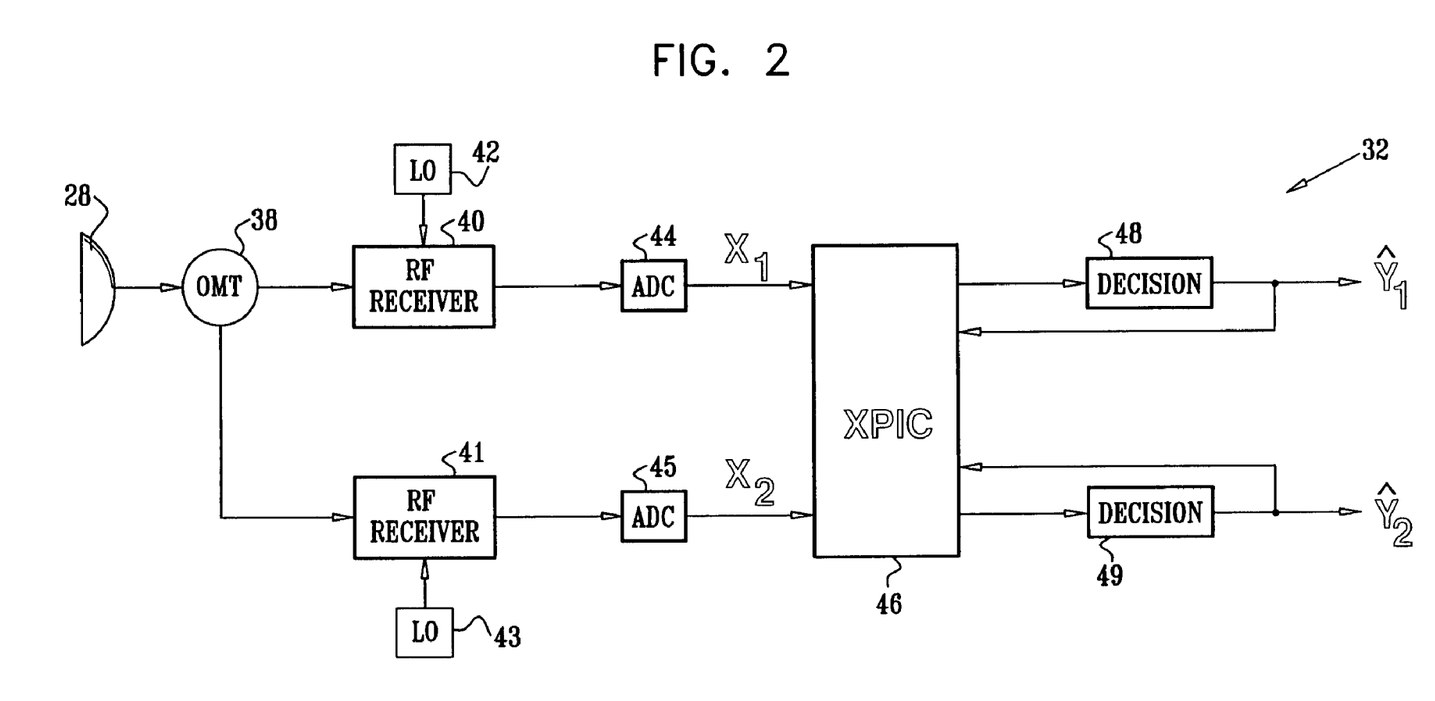
FIG. 2 is a block diagram that schematically illustrates a receiver used in the system of FIG. 1, in accordance with an embodiment of the present invention.

FIG. 2 is a block diagram showing elements of receiver 32, in accordance with an embodiment of the present invention. The signals received by antenna 28 is separated into orthogonal polarization components by an orthogonal mode transducer (OMT) 38. The two orthogonal components are input to respective RF receiver circuits 40 and 41, which performs analog processing and downconvert the signal under control of respective local oscillators 42 and 43. The use of separate local oscillators for the two polarization channels reduces the cost of receiver 32, but tends to introduce phase errors between the channels. (For this reason, receivers known in the art generally use a common oscillator for both channels.)

The downconverted signals are digitized by respective analog/digital converters 44 and 45, to generate streams of digital input samples, $x_1$ and $x_2$, representing the received signal. A cross-polarization interference canceller (XPIC) 46 filters and combines the sample streams in order to generate streams of corrected output samples $y_1$ and $y_2$. Respective decision devices 48 and 49, such as slicers, process each of the streams of output samples in order to generate respective sequences of symbols $\hat{y}_1$, $\hat{y}_2$. These symbols are then demodulated to recover the transmitted data $\hat{s}_1$, $\hat{s}_2$.

The digital demodulation circuits and other processing elements not essential to an understanding of the present invention are omitted from the figures for the sake of simplicity. The additional elements required in receiver 32 will be apparent to those skilled in the art, depending on the particular modulation scheme and communication protocols used in system 20.

Figure 3:
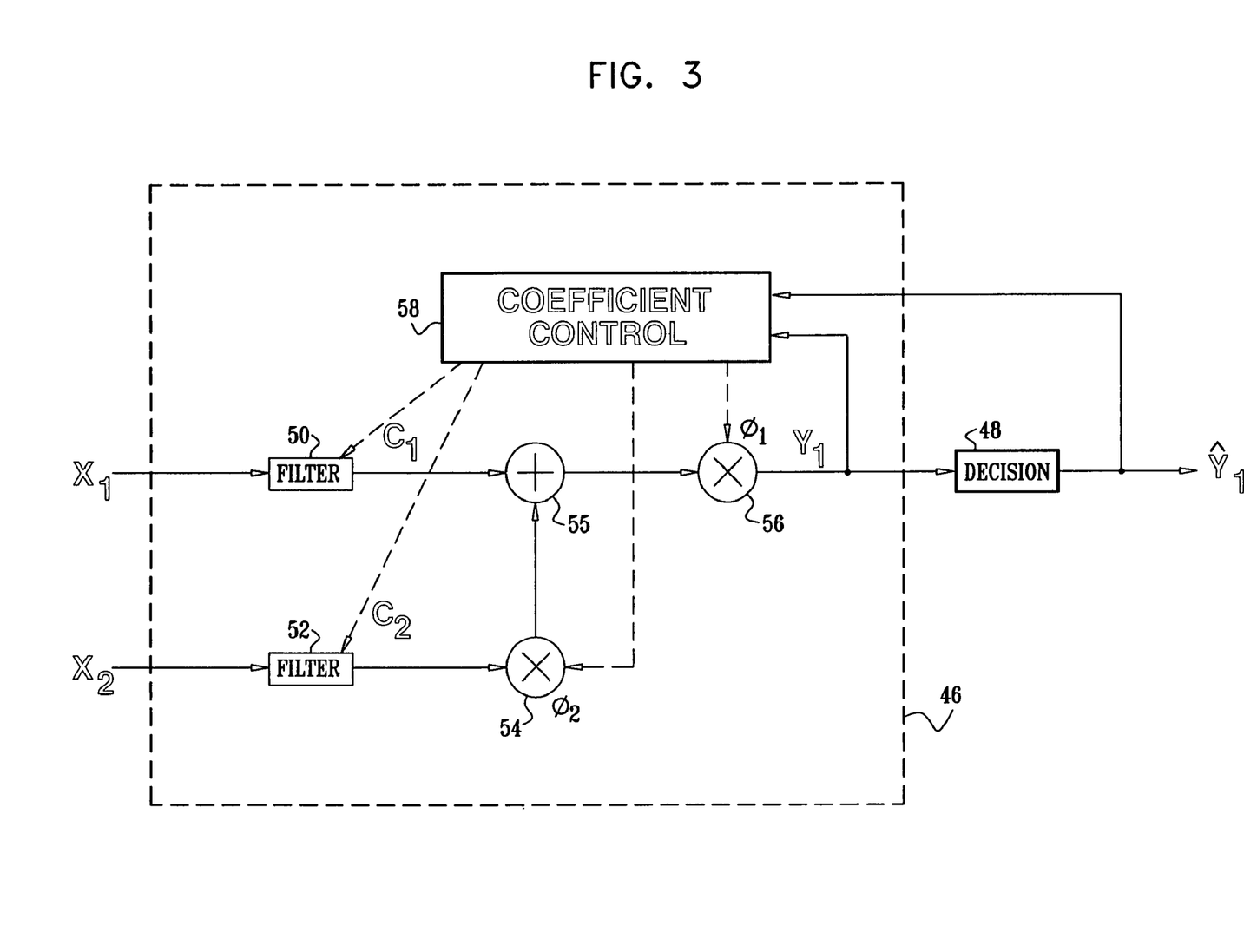
FIG. 3 is a block diagram that schematically shows details of a cross-polarization interference canceller (XPIC), in accordance with an embodiment of the present invention.

FIG. 3 is a block diagram that schematically shows details of one processing channel in XPIC 46, in accordance with an embodiment of the present invention. Although for the sake of simplicity, only one processing channel is shown in FIG. 3, XPIC 46 typically comprises two processing channels of this sort, one for each of the transmission channels in system 20. In addition to canceling inter-channel interference, XPIC 46 may also perform other equalization and phase correction functions, to compensate for effects of non-uniform fading and inter-symbol interference in the transmission channels, for example. Although XPIC 46 is shown and described below as comprising time-domain filters, and specifically multi-tap finite impulse response (FIR) filters, XPIC processors based on the principles of the present invention may alternatively be implemented using infinite impulse response (IIR) filters, frequency-domain filters, or any other suitable type of digital filtering that is known in the art.

As shown in FIG. 3, streams of digital samples $x_1$ and $x_2$, one stream for each of the two orthogonal polarizations, are input to respective processing chains, one comprising a digital filters 50 and the other comprising a digital filter 52. In this embodiment, filters 50 and 52 are n-tap FIR filters, with tap coefficients $\underline{c}_1 = \{c_{11}, c_{12}, \ldots, c_{1n}\}$ and $\underline{c}_2 = \{c_{21}, c_{22}, \ldots, c_{2n}\}$. The operation of filter 50 can thus be represented as the vector multiplication $\underline{c}_1^T \underline{x}_1$, wherein $\underline{x}_1$ is a vector of n successive samples. The operation of filter 52 can be similarly represented as $\underline{c}_2^T \underline{x}_2$. The processing chain of filter 52 also comprises a phase rotator 54, which applies a variable phase shift $\phi_2$ to the samples that are output from filter 52, in order to correct for relative phase variations between the $x_1$ and $x_2$ signals. These phase variations may arise, for example, due to the relative phase difference between local oscillators 42 and 43, as mentioned above. (By the same token, rotator 54 could be configured to apply the opposite phase shift to the output of filter 50. Alternatively, this variable phase shift may be applied by appropriate adjustment to the tap coefficients of filter 52 or 50.)

An adder 55 sums the phase-shifted samples from phase rotator 54 with the samples output from filter 50, in order to give an interference-canceled sample stream. A further phase rotator 56 corrects the phase of the summed samples to give the output sample stream:

$$y_1 = e^{j\phi_1}(\underline{c}_1^T \underline{x}_1 + e^{j\phi_2} \underline{c}_2^T \underline{x}_2) \quad (2)$$

The $y_2$ channel of XPIC 46 operates in a similar fashion. Note that according to this design, the filtering and phase rotation portions of XPIC 46 may be assembled from two identical, standard integrated circuit devices.

The coefficients $\underline{c}_1$ and $\underline{c}_2$ and the phase corrections $\phi_1$ and $\phi_2$ are determined adaptively by a coefficient controller 58. At each adaptation cycle n, controller 58 computes an error signal $\epsilon$ for each filter and phase rotator, and uses this value in adjusting the coefficients and phases based on the values from the previous cycle:

$$\underline{c}_1^{(n)} = \underline{c}_1^{(n-1)} - \mu_{C1} \epsilon_{x1} \underline{x}_1$$

$$\underline{c}_2^{(n)} = \underline{c}_2^{(n-1)} - \mu_{C2} \epsilon_{x2} \underline{x}_2$$

$$\phi_1^{(n)} = \phi_1^{(n-1)} - \mu_{\phi 1} \Im\{\epsilon_{\phi 1} y_1^*\}$$

$$\phi_2^{(n)} = \phi_2^{(n-1)} - \mu_{\phi 2} \Im\{\epsilon_{\phi 2} z^*\} \quad (3)$$

Here $z = e^{j\phi_2} \underline{c}_2^T \underline{x}_2$, i.e., z corresponds to the output of rotator 54. The error signals $\epsilon_x$ and $\epsilon_\phi$ are derived arithmetically from a single, simple error value $\in$, as described hereinbelow.

The convergence factors $\mu_C$ and $\mu_\phi$ are determined so as to give optimal tracking of changes without excessive variance. As the value of $\mu$ used by coefficient controller 58 is increased, the convergence of the adaptive element (filter or rotator) to which $\mu$ is applied becomes faster, so that the element will adapt more rapidly to changes in the transmission channel. On the other hand, large values of $\mu$ increase the variance of the coefficients around their optimal values, and may even lead to instability, so that in the presence of noise, the adaptive element may never converge. The inventors have found that in the configuration of XPIC 46, in which phase adjustment by rotator 54 is separated from the adaptation of multi-tap filters 50 and 52, $\mu_\phi$ may be set to a value considerably higher than $\mu_C$, for example, twice the value of $\mu_C$.

A wide variety of methods are known in the art for adaptive determination of filter coefficients. Substantially any suitable method of this sort may be implemented in coefficient controller 58. One well-known family of methods is the group of Least Mean Square (LMS) methods, as described, for example, by Haykin in *Adaptive Filter Theory* (3rd edition, Prentice Hall, 1996), which is incorporated herein by reference. These methods are based on choosing the filter coefficients and phase rotation so as to minimize the expected value of a cost function J, given by $J = |y_1 - \hat{y}_1|^2$. LMS methods generally work well when the filter coefficients are close to the correct values, so that $\hat{y}_1$ is equal to the actual transmitted symbol $s_1$. A training sequence of known symbols may therefore be used in order to set the initial filter coefficients.

Alternatively, coefficient controller 58 may initially use a blind adaptation method (also referred to as blind equalization) to set the filter coefficients and phase shift. After the blind adaptation process has converged (so that the error value $\in$ is less than a predetermined threshold), the coefficient controller switches over to LMS adaptation. Blind adaptation may be performed using the Constant Modulus Algorithm (CMA), as described, for example, by Johnson et al., in "Blind Equalization Using the Constant Modulus Criterion: A Review," *Proceedings of the IEEE* 86:10 (1998), pages 1927–1950, which is incorporated herein by reference. CMA sets the filter coefficients and phase shift so as to minimize the expected value of a cost function given by the square of the difference between the modulus of the output samples $|y_1|^2$ and a constant R, which depends on the expected value of the transmitted signal s. Various different constant modulus cost functions can be used in blind equalization. CMA typically uses the cost function $$C = E[(|y_1|^2 - R)^2], \text{ wherein } R = E[|s|^4]/E[|s|^2].$$

For the LMS and CMA cost functions given above, J and C, the error value $\in$ may be defined as follows:

$$\in = \begin{cases} 2e^{-j\phi_1}(y_1 - \hat{y}_1) & LMS \\ 4e^{-j\phi_1} y_1 (|y_1|^2 - R) & CMA \end{cases} \quad (4)$$

Inserting equation (2) into the formulas for J and C given above, and taking the partial derivatives of J and C with respect to $\underline{c}_1, \underline{c}_2, \phi_1$ and $\phi_2$ gives the following error signals:

$$\epsilon_{x1} = \in^*$$

$$\epsilon_{x2} = (e^{-j\phi_2} \in)^*$$

$$\epsilon_{\phi 1} e^{j\phi_1} \in$$

$$\epsilon_{\phi 2} = \in \quad (5)$$

These error values are used by coefficient controller 58 in computing the value of equations (3) at each adaptation cycle. It will be observed that the same basic error value $\in$ is used to determine all the error signals, for both of filters 50 and 52 and rotators 54 and 56, and for both CMA and LMS adaptation phases. (Note, however, that the cost function used in CMA contains no phase information, so that $\phi_1$ can be adjusted only in the LMS phase.) The error signals are derived from $\in$ by simple phase angle rotations. Thus, controller 58 may be implemented simply and economically.

Typically, the elements of XPIC 46, along with other digital components of receiver 32, comprise dedicated logic circuits, which may be produced as custom or semi-custom integrated circuits, or may comprise field-programmable gate arrays or other programmable logic components. Alternatively or additionally, receiver 32 may comprise a microprocessor or digital signal processor, and/or hard-wired logic circuits. Therefore, although the elements of the receiver shown in FIGS. 2 and 3 are divided into certain functional blocks for the sake of logical clarity, it will be understood that in actual implementations of the receiver, some or all of these blocks may be combined into one or more integrated components, or alternatively may be divided into sub-blocks. For example, a single filter, operating at twice the sample clock rate of A/D converters 44, may be switched to filter the $x_1$ and $x_2$ samples in alternation. Other variations on the implementation of receiver 32 to carry out the functions described hereinabove will be apparent to those skilled in the art and are considered to be within the scope of the present invention.

Although the embodiments described above relate to receiving and reducing interference in signals transmitted at orthogonal polarizations, the principles of the present invention may more generally be applied to reducing interference in signals received by multi-channel wireless receivers of other types. For example, in an interference-limited environment, a system could use one antenna to collect a desired signal, which is perturbed by an interfering signal. A second antenna could be used to collect the interfering signal (which is perturbed by the desired signal). Feeding the two signals into filters 50 and 52, respectively, will result in attenuation of the interfering signal content at the output of decision device 48. Furthermore, the design of receiver 32 is also useful in improving the signal/noise ratio of a communication system by means of polarization diversity, even when the transmitter does not transmit signals at orthogonal polarizations.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A receiver, comprising:
    an input circuit, which is coupled to at least one antenna so as to receive, process and digitize first and second signals, thus generating first and second streams of input samples;
    an interference cancellation circuit, comprising:
        first and second processing chains, which are respectively coupled to filter the first and second streams of input samples using respective first and second adaptive coefficients to generate respective first and second filter outputs, at least one of the first and second processing chains being further adapted to apply a variable phase shift so as to compensate for a phase deviation between the first and second signals; and
        an adder, which is coupled to sum the first and second filter outputs so as to generate a third stream of output samples, which is representative of the first signal; and
    a coefficient controller, which is operative to set the first and second adaptive coefficients and to separately set the variable phase shift responsively to the output samples.

2. The receiver according to claim 1, wherein the first and second processing chains respectively comprise first and second adaptive equalization filters.

3. The receiver according to claim 2, wherein at least one of the first and second processing chains comprises an adaptive phase rotator, which is coupled to apply the variable phase shift to an output of at least one of the first and second adaptive equalization filters.

4. The receiver according to claim 1, wherein the first signal contains interference due to the second signal, and wherein the coefficient controller is operative to determine the first and second coefficients and the variable phase shift so as to reduce the interference due to the second signal in the stream of output samples.

5. The receiver according to claim 1, wherein the coefficient controller is operative to set the variable phase shift responsively to a first convergence factor, and to set at least the second adaptive coefficients responsively to a second convergence factor, wherein the convergence factors are selected so that the adaptive phase rotator adapts to a change in the interference due to the second signal substantially faster than the second adaptive filter.

6. The receiver according to claim 5, wherein the coefficient controller is operative to determine an error value responsively to the output samples, and to set the first and second adaptive coefficients and the variable phase shift responsively to the error value.

7. The receiver according to claim 6, wherein the coefficient controller is operative to determine respective error signals to apply in setting each of the first and second adaptive coefficients and the variable phase shift by applying different phase rotations to the error value.

8. The receiver according to claim 6, and comprising a further phase rotator, which is coupled to apply a further variable phase shift to the output samples responsively to the error value.

9. The receiver according to claim 6, wherein the coefficient controller is operative in an initial phase of operation of the receiver to determine the error value using a blind adaptation criterion, and in a subsequent phase of the operation of the receiver to determine the error value using a Least Mean Square (LMS) criterion.

10. The receiver according to claim 8, wherein the blind adaptation criterion comprises a constant modulus criterion.

11. The receiver according to claim 1, wherein the first and second signals respectively carry first and second sequences of symbols representing first and second transmitted data, and wherein the receiver comprises a decision device, which is coupled to process the output samples in order to recover the first sequence of symbols.

12. The receiver according to claim 1, wherein the interference cancellation circuit is further operative to process the first and second streams of the input samples so as to generate a fourth stream of output samples, which is representative of the second signal.

13. The receiver according to claim 1, wherein the first and second signals are transmitted with respective first and second, mutually orthogonal polarizations.

14. A receiver, comprising:
    an input circuit, which is coupled to at least one antenna so as to receive, process and digitize first and second signals, thus generating first and second streams of input samples; and
    an interference cancellation circuit, comprising:
        a first adaptive filter, which is coupled to filter the first stream of input samples using first adaptive coefficients to generate a first filter output;
        a second adaptive filter, which is coupled to filter the second stream of input samples using second adaptive coefficients to generate a second filter output;
        an adaptive phase rotator, which is coupled to apply a variable phase shift to at least one of the first and second filter outputs so as to compensate for a phase deviation between the first and second signals; and
        an adder, which is coupled to sum the first and second filter outputs following application of the variable phase shift so as to generate a third stream of output samples, which is representative of the first signal.

15. The receiver according to claim 14, wherein the first signal contains interference due to the second signal, and wherein the first and second coefficients and the variable phase shift are determined so as to reduce the interference due to the second signal in the stream of output samples.

16. The receiver according to claim 14, wherein the interference cancellation circuit comprises a coefficient controller, which is operative to set the first and second adaptive coefficients and the variable phase shift responsively to the output samples.

17. The receiver according to claim 14, wherein the first and second signals respectively carry first and second sequences of symbols representing first and second transmitted data, and wherein the receiver comprises a decision device, which is coupled to process the output samples in order to recover the first sequence of symbols.

18. The receiver according to claim 14, wherein the interference cancellation circuit is further operative to process the first and second streams of the input samples so as to generate a fourth stream of output samples, which is representative of the second signal.

19. The receiver according to claim 14, wherein the first and second signals are transmitted with respective first and second, mutually orthogonal polarizations.

20. Apparatus for wireless communication, comprising:
   a transmitter, which is operative to transmit first and second signals over the air; and
   a receiver, which comprises:
      an input circuit, which is coupled to at least one antenna so as to receive, process and digitize first and second signals, thus generating first and second streams of input samples;
      an interference cancellation circuit, comprising:
         first and second processing chains, which are respectively coupled to filter the first and second streams of input samples using respective first and second adaptive coefficients to generate respective first and second filter outputs, at least one of the first and second processing chains being further adapted to apply a variable phase shift so as to compensate for a phase deviation between the first and second signals; and
         an adder, which is coupled to sum the first and second filter outputs so as to generate a third stream of output samples, which is representative of the first signal; and
      a coefficient controller, which is operative to set the first and second adaptive coefficients and to separately set the variable phase shift responsively to the output samples.

21. The apparatus according to claim 20, wherein the first and second processing chains respectively comprise first and second adaptive equalization filters.

22. The apparatus according to claim 21, wherein at least one of the first and second processing chains comprises an adaptive phase rotator, which is coupled to apply the variable phase shift to an output of at least one of the first and second adaptive equalization filters.

23. The apparatus according to claim 20, wherein the first signal contains interference due to the second signal, and wherein the coefficient controller is operative to determine the first and second coefficients and the variable phase shift so as to reduce the interference due to the second signal in the stream of output samples.

24. The apparatus according to claim 20, wherein the coefficient controller is operative to set the variable phase shift responsively to a first convergence factor, and to set at least the second adaptive coefficients responsively to a second convergence factor, wherein the convergence factors are selected so that the adaptive phase rotator adapts to a change in the interference due to the second signal substantially faster than the second adaptive filter.

25. The apparatus according to claim 20, wherein the coefficient controller is operative to determine an error value responsively to the output samples, and to set the first and second adaptive coefficients and the variable phase shift responsively to the error value.

26. The apparatus according to claim 25, wherein the coefficient controller is operative to determine respective error signals to apply in setting each of the first and second adaptive coefficients and the variable phase shift by applying different phase rotations to the error value.

27. The apparatus according to claim 25, wherein the receiver comprises a further phase rotator, which is coupled to apply a further variable phase shift to the output samples responsively to the error value.

28. The apparatus according to claim 25, wherein the coefficient controller is operative in an initial phase of operation of the apparatus to determine the error value using a blind adaptation criterion, and in a subsequent phase of the operation of the apparatus to determine the error value using a Least Mean Square (LMS) criterion.

29. The apparatus according to claim 28, wherein the blind adaptation criterion comprises a constant modulus criterion.

30. The apparatus according to claim 20, wherein the first and second signals respectively carry first and second sequences of symbols representing first and second transmitted data, and wherein the receiver comprises a decision device, which is coupled to process the output samples in order to recover the first sequence of symbols.

31. The apparatus according to claim 20, wherein the interference cancellation circuit is further operative to process the first and second streams of the input samples so as to generate a fourth stream of output samples, which is representative of the second signal.

32. The apparatus according to claim 20, wherein the transmitter is configured to transmit the first and second signals with respective first and second, mutually orthogonal polarizations, and wherein the input circuit is configured to separate the first and second polarizations.

33. Apparatus for wireless communication, comprising:
   a transmitter, which is operative to transmit first and second signals over the air; and
   a receiver, which comprises:
      an input circuit, which is coupled to receive, process and digitize the first and second signals so as to generate respective first and second streams of input samples; and
      an interference cancellation circuit, comprising:
         a first adaptive filter, which is coupled to filter the first stream of input samples using first adaptive coefficients to generate a first filter output;
         a second adaptive filter, which is coupled to filter the second stream of input samples using second adaptive coefficients to generate a second filter output;
         an adaptive phase rotator, which is coupled to apply a variable phase shift to at least one of the first and second filter outputs so as to compensate for a phase deviation between the first and second signals; and
         an adder, which is coupled to sum the first and second filter outputs following application of the variable phase shift so as to generate a third stream of output samples, which is representative of the first signal.

34. The apparatus according to claim 33, wherein the first signal received by the input circuit contains interference due to the second signal, and wherein the first and second coefficients and the variable phase shift are determined so as to reduce the interference due to the second signal in the stream of output samples.

35. The apparatus according to claim 33, wherein the interference cancellation circuit comprises a coefficient controller, which is operative to set the first and second adaptive coefficients and the variable phase shift responsively to the output samples.

36. The apparatus according to claim 33, wherein the first and second signals respectively carry first and second sequences of symbols representing first and second transmitted data, and wherein the receiver comprises a decision device, which is coupled to process the output samples in order to recover the first sequence of symbols.

37. The apparatus according to claim 33, wherein the interference cancellation circuit is further operative to process the first and second streams of the input samples so as to generate a fourth stream of output samples, which is representative of the second signal.

38. The apparatus according to claim 33, wherein the transmitter is configured to transmit the first and second signals with respective first and second, mutually orthogonal polarizations, and wherein the input circuit is configured to separate the first and second polarizations.

39. A method for wireless communication, comprising:
receiving first and second signals transmitted over the air;
processing and digitizing the received signals so as to generate respective first and second streams of input samples;
filtering the first and second streams of input samples using respective first and second adaptive coefficients to generate respective first and second filter outputs, said filtering comprising applying a variable phase shift so as to compensate for a phase deviation between the first and second signals;
summing the first and second filter outputs following application of the variable phase shift so as to generate a third stream of output samples, which is representative of the first signal; and
setting the first and second adaptive filter coefficients and separately setting the variable phase shift responsively to the output samples.

40. The method according to claim 39, wherein filtering the first and second streams of the input sample comprises respectively applying first and second adaptive equalization filters to the first and second streams.

41. The method according to claim 40, wherein applying the variable phase shift comprises applying an adaptive phase rotator to an output of at least one of the first and second adaptive equalization filters.

42. The method according to claim 39, wherein summing the first and second filter outputs comprises generating the third stream of output samples so as to reduce an interference in the first signal due to the, second signal.

43. The method according to claim 39, wherein setting the variable phase shift comprises adjusting the variable phase shift responsively to a first convergence factor, and wherein setting the second adaptive filter coefficients comprises adjusting the second adaptive filter coefficients responsively to a second convergence factor, wherein the convergence factors are selected so that the adaptive phase rotator adapts to a change in the interference due to the second signal substantially faster than the second adaptive filter.

44. The method according to claim 39, wherein setting the first and second adaptive filter coefficients and the variable phase shift comprises determining an error value responsively to the output samples, and setting the first and second adaptive filter coefficients and the variable phase shift responsively to the error value.

45. The method according to claim 44, wherein setting the first and second adaptive filter coefficients and the variable phase shift comprises determining respective error signals to apply in setting each of the first and second adaptive filter coefficients and the variable phase shift by applying different phase rotations to the error value.

46. The method according to claim 44, and comprising applying a further variable phase shift to the output samples responsively to the error value.

47. The method according to claim 44, wherein determining the error value comprises, in an initial phase of operation, determining the error value using a blind adaptation criterion, and in a subsequent phase of the operation, determining the error value using a Least Mean Square (LMS) criterion.

48. The method according to claim 47, wherein the blind adaptation criterion comprises a constant modulus criterion.

49. The method according to claim 39, wherein the first and second signals respectively carry first and second sequences of symbols representing first and second transmitted data, and comprising processing the output samples in order to recover the first sequence of symbols.

50. The method according to claim 39, wherein filtering the first and second streams of the input samples and applying the variable phase shift comprise processing the first and second streams of the input samples so as to generate a fourth stream of output samples, which is representative of the second signal.

51. The method according to claim 39, wherein the first and second signals are transmitted with respective first and second, mutually orthogonal polarizations, and wherein receiving the first and second signals comprises separating the first and second polarizations.

52. A method for wireless communication, comprising:
receiving first and second signals transmitted over the air;
processing and digitizing the received signals so as to generate respective first and second streams of input samples;
filtering the first stream of input samples using first adaptive filter coefficients to generate a first filter output;
filtering the second stream of input samples using second adaptive filter coefficients to generate a second filter output;
applying a variable phase shift to at least one of the first and second filter outputs so as to compensate for a phase deviation between the first and second signals; and
summing the first and second filter outputs following application of the variable phase shift so as to generate a third stream of output samples, which is representative of the first signal.

53. The method according to claim 52, wherein summing the first and second filter outputs comprises generating the third stream of output samples so as to reduce an interference in the first signal due to the second signal.

54. The method according to claim 52, wherein filtering the first and second streams of the input samples and applying the variable phase shift comprise setting the first and second adaptive filter coefficients and the variable phase shift responsively to the output samples.

55. The method according to claim 52, wherein the first and second signals respectively carry first and second sequences of symbols representing first and second transmitted data, and comprising processing the output samples in order to recover the first sequence of symbols.

56. The method according to claim 52, wherein filtering the first and second streams of the input samples and applying the variable phase shift comprise processing the first and second streams of the input samples so as to generate a fourth stream of output samples, which is representative of the second signal.

57. The method according to claim 52, wherein the first and second signals are transmitted with respective first and second, mutually orthogonal polarizations, and wherein receiving the first and second signals comprises separating the first and second polarizations.

* * * * *